United States Patent
Cho et al.

(10) Patent No.: US 6,555,269 B2
(45) Date of Patent: Apr. 29, 2003

(54) POSITIVE ACTIVE MATERIAL FOR RECHARGEABLE LITHIUM BATTERY AND METHOD OF PREPARING SAME

(75) Inventors: Jae-Phil Cho, Cheonan (KR); Chan-Soo Kim, Seoul (KR); Sang-Im Yoo, Seoul (KR)

(73) Assignee: Samsung SDI Co., Ltd., Kyungki-do (KR)

(*) Notice: Subject to any disclaimer, the term of this patent is extended or adjusted under 35 U.S.C. 154(b) by 100 days.

(21) Appl. No.: 09/780,738

(22) Filed: Feb. 9, 2001

(65) Prior Publication Data
US 2001/0016285 A1 Aug. 23, 2001

(30) Foreign Application Priority Data
Feb. 10, 2000 (KR) .......................................... 2000-6294

(51) Int. Cl.[7] ................................................ H01M 4/58
(52) U.S. Cl. ........................ 429/231.1; 429/218.1; 429/231.3; 429/223
(58) Field of Search ........................ 429/231.3, 218.1, 429/223, 231.1

(56) References Cited

U.S. PATENT DOCUMENTS 5,705,291 A  1/1998 Amatucci et al. ........... 429/137
5,744,258 A * 4/1998 Bai et al. .................... 429/209
6,372,385 B1 * 4/2002 Kweon et al. ............. 429/218.1

FOREIGN PATENT DOCUMENTS

EP   511632 A1  * 11/1992  ............ H01M/4/58
JP   07235292 A * 9/1995   ............ H01M/4/02

* cited by examiner

*Primary Examiner*—Carol Chaney
(74) *Attorney, Agent, or Firm*—Christie, Parker & Hale, LLP

(57) ABSTRACT

Disclosed is a positive active material for a rechargeable lithium battery and a method of preparing the same. The positive active material includes a $LiCoO_2$ core and a metal selected from a group consisting of Al, Mg, Sn, Ca, Ti, Mn and mixtures thereof. The metal has a concentration gradient from a surface of the core to a center of the core.

The method of preparing a positive active material for a rechargeable lithium battery includes the steps of dissolving a metal compound in alcohol to prepare a metal compound solution in a sol state, coating $LiCoO_2$ with the metal compound solution in the sol state and sintering the coated $LiCoO_2$ at 150 to 500° C.

5 Claims, 6 Drawing Sheets

POSITIVE ACTIVE MATERIAL FOR RECHARGEABLE LITHIUM BATTERY AND METHOD OF PREPARING SAME

BACKGROUND OF THE INVENTION (a) Field of the Invention

The present invention relates to a positive active material for a rechargeable lithium battery and a method of preparing the same. More particularly, the present invention relates to a positive active material for a rechargeable lithium battery and a method of preparing the same in which a structure of the positive active material is made more stable.

(b) Description of the Related Art

There is an ever-increasing demand for rechargeable lithium batteries in electronic devices such as cellular phones, camcorders, and laptop computers. The positive active material in the rechargeable lithium battery is the main factor in determining the capacity of the battery. The electrochemical characteristics of the positive active materials influence the high-rate cycle characteristics and the capacity retention of the battery during service life.

Cobalt-based active materials have a higher capacity than manganese-based active materials, and have a higher degree of structural stability than nickel-based active materials. Thus, among all of positive active materials used in rechargeable lithium batteries, the cobalt-based active materials such as $LiCoO_2$ are the most commonly used (over 95% of rechargeable Li-ion batteries in the market today use $LiCoO_2$). In recent times, there has been ongoing research on enhancing charge capacity by increasing the charge voltage range.

$Li_{1-x}CoO_2$ has the most stable structure of all the positive active materials used in rechargeable lithium batteries. Although the compound has a stable structure of $\alpha$-$NaFeO_2$, the x value affects the structural stability. With rechargeable lithium batteries comprising $Li_xCoO_2$ within the limits of $0<x<0.5$ as the active material, the structure of the $Li_xCoO_2$ is stably maintained on charging and discharging cycling. However, when the x value is 0.5 or greater, the structure becomes unstable as a result of a phase transition causing abrupt decreases of capacity. This phase transition is attributed to a monoclinic phase formed at an x value approaching 0.5. The formation of the monoclinic phase causes a sharp reduction in a c-axis in the crystalline structure. When the x value is below 0.5, reduction of the c-axis occurs with formation of a hexagonal phase. When the x value is in the range between 0 and 0.7, the c-axis reduction is as much as 1.7%. On the other hand, the a-axis undergoes almost no change regardless of the x value.

Such non-uniform dimension changes stress particles unevenly, and at an elasticity limit of greater than 0.1%, fractures develop in the particles. The generation of such mechanical fractures directly results in a reduction in capacity. That is, maximally repressing the generation of a monoclinic phase of $LiCoO_2$ is a way to obtain structural (cyclic) stability. To this end, U.S. Pat. No. 5,705,291 of Amatucci et al. discloses a method in which a surface of the cobalt-based material is coated with a composition comprising a borate, aluminate, silicate, or mixtures thereof. However, a poor structural stability results with the application of this method.

SUMMARY OF THE INVENTION

It is an object of the present invention to provide a positive active material for a rechargeable lithium battery having a stable structure.

It is another object of the present invention to provide a method of preparing a positive active material for a rechargeable lithium battery having a stable structure.

These and other objects may be achieved by a positive active material for a rechargeable lithium battery comprising a $LiCoO_2$ core and a metal selected from a group consisting of Al, Mg, Sn, Ca, Ti, Mn and mixtures thereof. The metal has a concentration gradient from the surface of the core to the center of the core. That is, the surface concentration of the metal is higher than the core concentration thereof.

To achieve these objects, the present invention provides a method of preparing the positive active material for a rechargeable lithium battery. In this method, a metal compound is dissolved in alcohol to prepare a metal compound solution in a sol state, the metal compound solution in the sol state is coated on $LiCoO_2$, and the coated $LiCoO_2$ is sintered at 150 to 500° C.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE INVENTION

Figure 1:
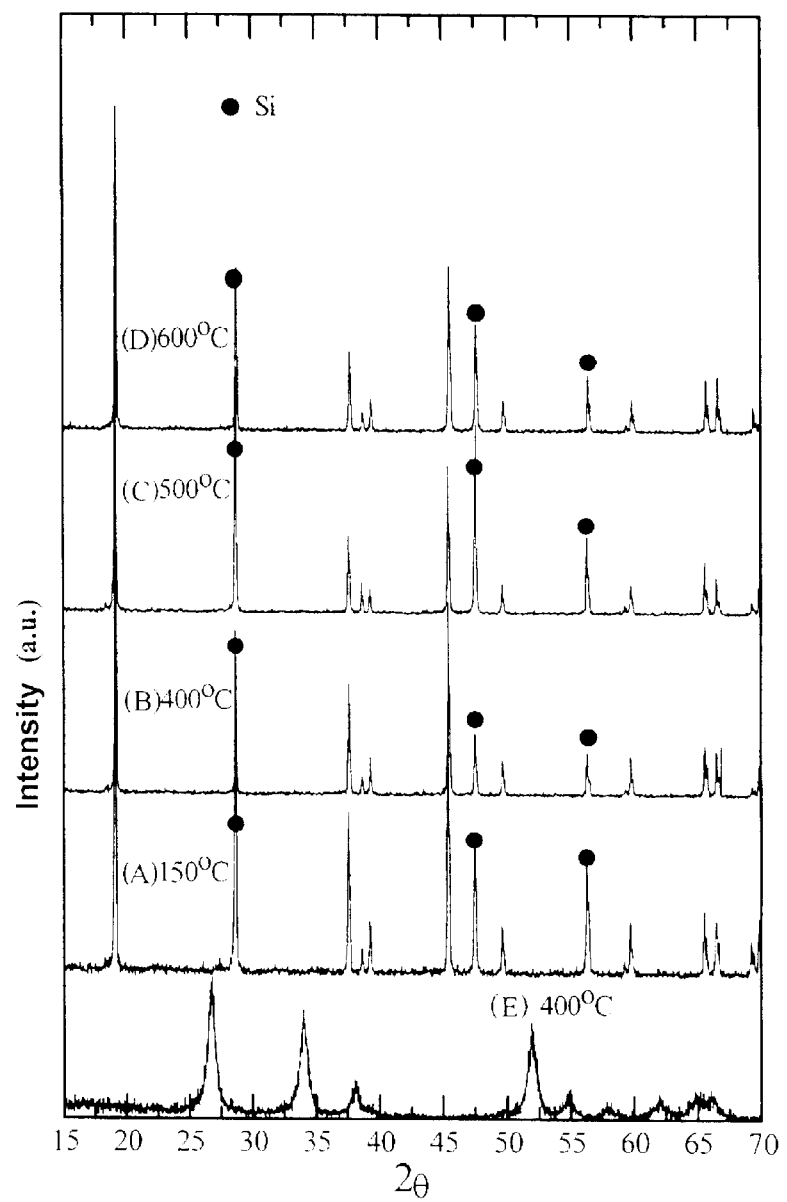
FIGS. 1(A) to (E) are graph sections illustrating XRD results of positive active materials for rechargeable lithium batteries of the present invention prepared by varying the heat treatment temperature.

A positive active material of the present invention for lithium rechargeable batteries includes a $LiCoO_2$ core and a metal selected from a group consisting of Al, Mg, Sn, Ca, Ti, Mn and mixtures thereof. The metal has a concentration gradient from the surface of the core to the center of the core. It is preferable that a ratio of the concentrations between the surface and the center is 3 to 10:1, and more preferably 5 to 10:1.

A method of preparing the positive active material for lithium rechargeable batteries of the present invention will now be described.

A metal compound is dissolved in alcohol to prepare a metal compound solution in a sol state. The metal compound may be an alkoxide of Al, Mg, Sn, Ca, Ti or Mn, or mixtures thereof and the exemplary thereof may be tin (IV) ethyl hexano-isopropoxide ($Sn(OOC_8H_{15})_2(OC_3H_7)_2$) or isopropoxide. The alcohol may be isopropanol, ethanol or methanol.

The metal compound solution ("sol") is coated on $LiCoO_2$. At this time, a concentration of the metal in the metal compound solution is preferably 0.1 to 6 mol % of a mixture amount of the metal and Co, and more preferably, 3 to 4 mol %. The coating process is preferably performed at a temperature of 300 to 800° C. for 2 to 12 hours.

During the coating process, the metal compound, e.g. metal alkoxide in the metal compound solution ("sol") is hydrolyzed by moisture in the atmosphere, and then the hydrolyzed product polycondenses to form a metal compound gel. Thereafter, the metal compound gel reacts with functional groups on a surface of $LiCoO_2$ and the metal compound gel is adhered to the surface of $LiCoO_2$.

The metal compound gel-adhered $LiCoO_2$ is dried at a temperature of 50 to 150° C. for 2 to 12 hours and the dried product is sintered at 150–500° C. for 2 to 12 hours. In case that the metal compound is a metal alkoxide, the metal alkoxide adhered to the surface is decomposed into an amorphous metal oxide in the drying process and then is crystallized to form a crystalline metal oxide in the sintering process. The formed metal oxide reacts with $LiCoO_2$ to form $LiCo_{1-x}M_xO_2$ solid solution where M is a metal selected from a group consisting of Al, Mg, Sn, Ca, Ti, Mn and mixtures thereof.

In the case where Sn is used as the metal in the coating process, the following chemical equations result.

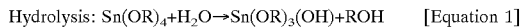

Hydrolysis: $Sn(OR)_4 + H_2O \rightarrow Sn(OR)_3(OH) + ROH$   [Equation 1]

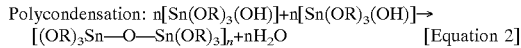

Polycondensation: $n[Sn(OR)_3(OH)] + n[Sn(OR)_3(OH)] \rightarrow$
$[(OR)_3Sn-O-Sn(OR)_3]_n + nH_2O$   [Equation 2]

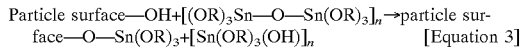

Particle surface—OH+$[(OR)_3Sn-O-Sn(OR)_3]_n \rightarrow$ particle surface—O—$Sn(OR)_3$+$[Sn(OR)_3(OH)]_n$   [Equation 3]

In the above equations OR is an alkoxy group and ROH is an alcohol.

With reference to Equation 2, the Sn—OH group is condensed to produce water and a polycondensate having Sn—O—Sn bond to form a tin alkoxide gel. Also, with reference to Equation 3, the tin alkoxy group of the gel reacts with the OH group of the $LiCoO_2$ particle surface, and a tin alkoxide gel is adhered to the $LiCoO_2$ surface. In subsequent processes, the tin alkoxide gel is decomposed into amorphous $SnO_2$ in a drying process, and it is crystallized to form crystalline $SnO_2$ in a sintering process. The crystalline $SnO_2$ reacts with $LiCoO_2$ to form $LiCo_{1-x}Sn_xO_2$ solid solution.

Since the formed metal oxide reacts not only on the surface of the $LiCoO_2$ but within the $LiCoO_2$, metal is present all throughout the $LiCoO_2$. However, since the reaction occurs more actively on the surface than within the $LiCoO_2$, a concentration of the metal on the surface of the $LiCoO_2$ is greater than the concentration of the metal within the $LiCoO_2$. This is not the case when the sintering temperature is increased. That is, there is an increase in the amount of metal oxide intercalated within the $LiCoO_2$ with increases in the sintering temperature. Accordingly, if the sintering temperature is made too high, equal amounts of metal oxide are present on the surface and within the $LiCoO_2$, resulting in a reduction in cycle life characteristics.

In particular, if the sintering process is performed at a temperature exceeding 500° C., the ratio of the concentrations of the metal oxide between the surface and center of the $LiCoO_2$ falls below 3:1 such that a monoclinic phase active material is prepared, thereby reducing the cyclic life. On the other hand, if the sintering process is performed at less than 150° C., the charge-discharge efficiency significantly decreases.

It is possible to use $LiCoO_2$ which is commercially available or prepared by the following method.

A cobalt oxide such as $Co_3O_4$ is mixed with a lithium salt such as LiOH. The mixing process is performed using an automatic mixer, and the two substances are homogenized for 1 to 3 hours. At this time, although the mole ratio of cobalt to lithium is intended to be 1:1, a slight excess amount of Li is used in the mixture, since a portion of the Li is lost during the subsequent heating process.

The resulting mixture is heat-treated at about 900° C. for a period of about 24 hours. The heat-treating process is performed in an oxygen stream. The mixture is sieved to prepare a positive active material for a rechargeable lithium battery. It is preferable to use a two-step heat-treating process for the preparation, the first step at 500° C. for 6 to 12 hours and the second step at 900° C. for 24 hours. By heat-treating the mixture in two steps rather than a single step, the crystallinity is improved.

The rechargeable lithium battery applying the positive active material of the present invention may use the commonly utilized carbonaceous active material of graphite, carbon, etc., which enables the intercalation-deintercalation of lithium ions for the negative electrode. The commonly used non-aqueous liquid electrolyte, polymer electrolyte, etc. may be used for the electrolyte. A microporous membrane separator may be used in the rechargeable lithium battery of the present invention, if needed.

The following examples further illustrate the present invention.

EXAMPLE 1

As a starter material, $Co_3O_4$ (average particle size of 5 mm) and $LiOH.H_2O$ powder finely ground were placed in an automatic mixer in a mole ratio of 1:1.05 and homogenized for 2 hours to prepare $LiCoO_2$. An excess of Li was used since a portion of the Li is lost in the heat-treating process. The resulting compound was heat-treated at 500° C. for 5 hours in an oxygen stream, and then was again heat-treated at 900° C. for 24 hours in an oxygen stream. The compound $LiCoO_2$ was then sieved by passing it through a 500-mesh screen (26 mm). The sieved compound $LiCoO_2$ is sieved additionally to obtain $LiCoO_2$ having an average particle size of 10 μm.

Subsequently, tin(IV) ethyl hexano-isopropoxide ($Sn(OOC_8H_{15})_2(OC_3H_7)_2$) was dissolved in isopropanol, then agitated at 21° C. for 20 hours, thereby producing a sol metal solution. The sol metal solution was coated on a surface of the $LiCoO_2$. The amount of Sn in the coated material was 3 mol % of the total amount of Sn and Co. The coated $LiCoO_2$ was dried at 150° C. for 10 hours, then sintered at 150° C. for 10 hours to prepare a positive active material for a rechargeable lithium battery.

EXAMPLE 2

A positive active material was prepared by the same procedure as in Example 1 except that the $LiCoO_2$ dried at 150° C. for 10 hours was sintered at 400° C. for 10 hours.

EXAMPLE 3

A positive active material was prepared by the same procedure as in Example 1 except that the $LiCoO_2$ dried at 150° C. for 10 hours was sintered at 500° C. for 10 hours.

COMPARATIVE EXAMPLE 1

A positive active material was prepared by the same procedure as in Example 1 except that the $LiCoO_2$ dried at 150° C. for 10 hours was sintered at 600° C. for 10 hours.

COMPARATIVE EXAMPLE 2

A positive active material was prepared by the same procedure as in Example 1 except that the $LiCoO_2$ was not coated with the Sn solution.

COMPARATIVE EXAMPLE 3

1 g of $H_3BO_3$ was dissolved in 20 ml of acetone, and then the resulting solution and 10 g of $LiCoO_2$ were mixed well. The mixture was heat-treated at 600° C. for 10 hours.

XRD Results of the Materials

XRD patterns for the positive active materials of Examples 1–3 and Comparative Example 1 were measured. The results are shown, respectively, in (A), (B), (C), and (D) of FIG. 1. "•" in FIG. 1 indicates a Si reference peak and (E) in FIG. 1 shows the XRD pattern for $SnO_2$ heat-treated at 400° C. As shown in FIG. 1, the active materials according to Examples 1 to 3 have no $SnO_2$ peak. This observation may be due to either the fact that the thickness of the $SnO_2$ coating the surfaces is too thin for the X-ray signal or that $LiCo_{1-x}Sn_xO_2$ solid solution is formed.

Figure 2:
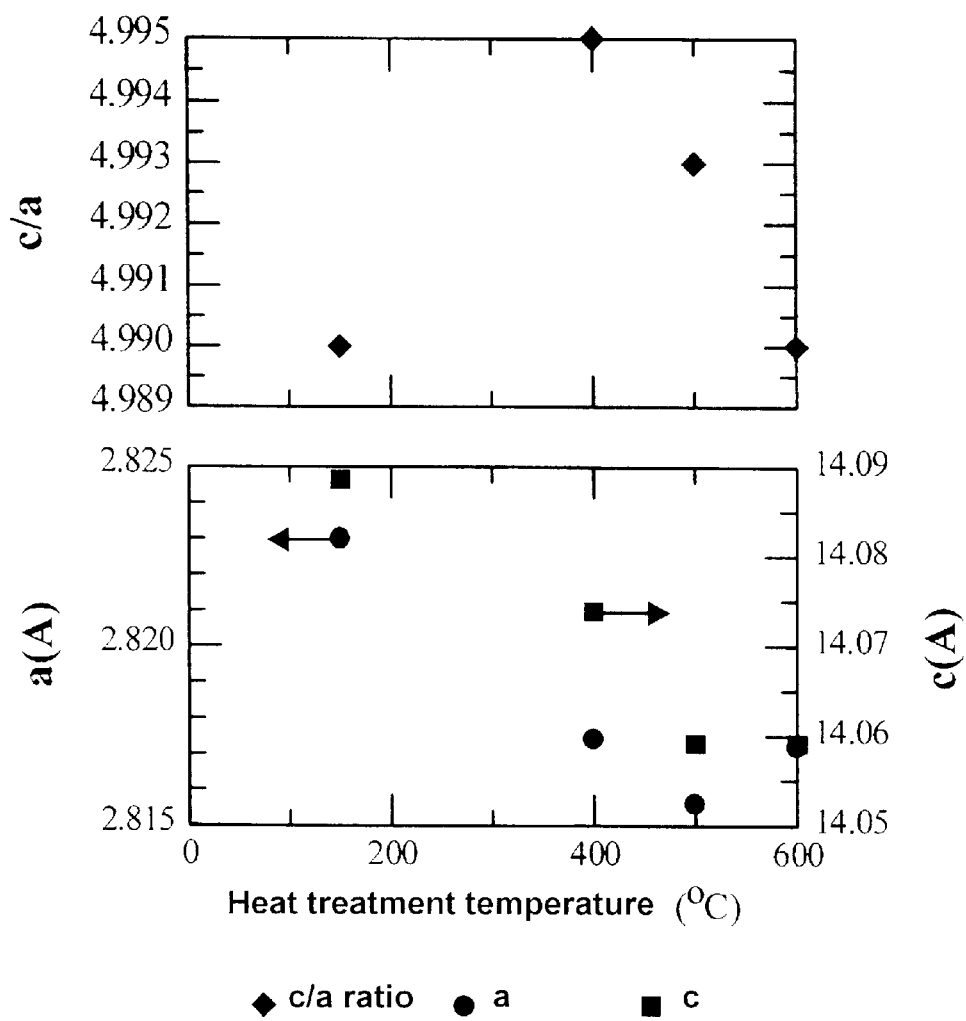
FIG. 2 is a graph illustrating crystalline lattice constants of positive active materials for rechargeable lithium batteries of the present invention prepared by varying the heat treatment temperature.

To determine these possibilities, lattice constants (a, c) of the active materials prepared at various heat-treating temperatures were measured. The results are shown in FIG. 2. As shown in FIG. 2, when sintering at 150° C., $SnO_2$ existed on the surface, as with the $LiCoO_2$. With an increase in temperature, there is a change in the value of the constants. It is evident from this result that a structure of the Sn atoms present on the surface changes according to their reaction with a $LiCoO_2$ bulk.

EPMA Results of the Materials

Figure 3:
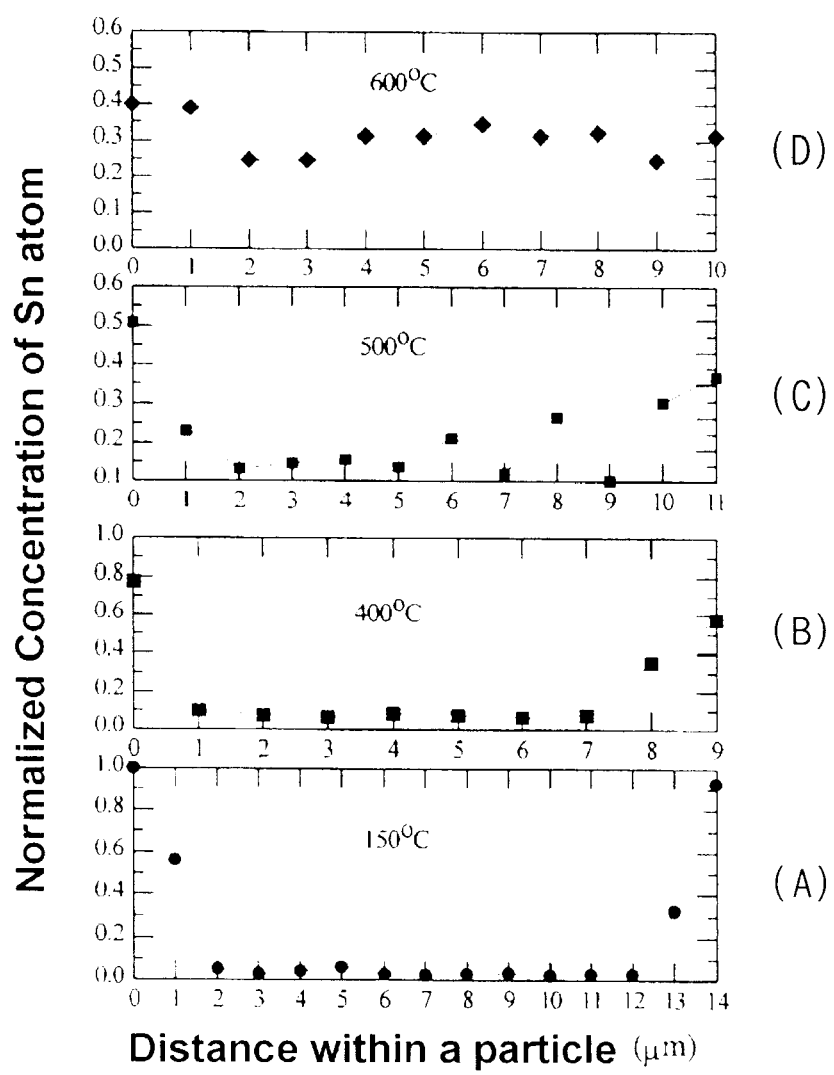
FIGS. 3(A) to (D) are graphs illustrating EPMA analysis results of positive active materials for rechargeable lithium batteries of the present invention prepared by varying the heat treatment temperature.

EPMA (electron probe mass analysis) results are shown in FIG. 3. Values of the horizontal axis (x-axis) in FIG. 3 represent a distance within a particle. When a line is drawn through a center of the particles, a center value of the x-axis is a center of the particles. The smallest and largest values at both ends are surfaces of the particles. As shown in FIGS. 3(A) to (D), the concentration of Sn at the surface decreases with increases in temperature, while the bulk (internal and center) concentration increases. At 600° C., the Sn concentration in the bulk approached that at the surface forming a nearly homogeneous solid solution. Results of a chemical analysis of the active material of Example 3 showed that the overall content of Sn was 3 mole % (x=0.03 in $LiCo_{1-x}Sn_xO_2$). The concentrations of Sn in the active material in FIGS. 3(A) to (D) were normalized using this value.

Figure 4:
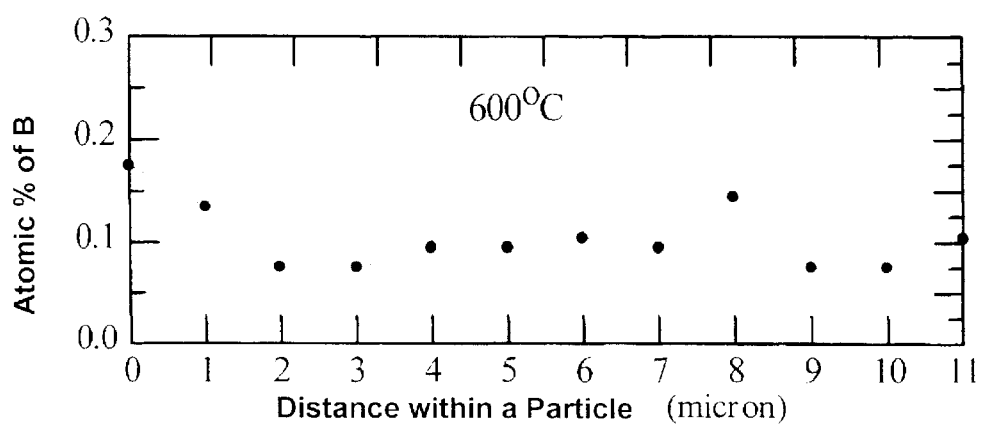
FIG. 4 is a graph illustrating EPMA analysis results of a positive active material of Comparative Example 3.

As shown in FIG. 4, an EPMA of the positive active material of the Comparative Example 3 showed that the concentration of B in the bulk region was lower than that at the surface. The concentration of B at the surface appears to be reduced significantly, although it is possible that the B at the surface might be present as a boron compound. The elevated temperature (600° C.) might be the cause of the relatively even dispersion of B through the bulk of the particle in a similar manner to the case of Sn as shown in FIG. 3(D).

Electrochemical Evaluation Test

Figure 5:
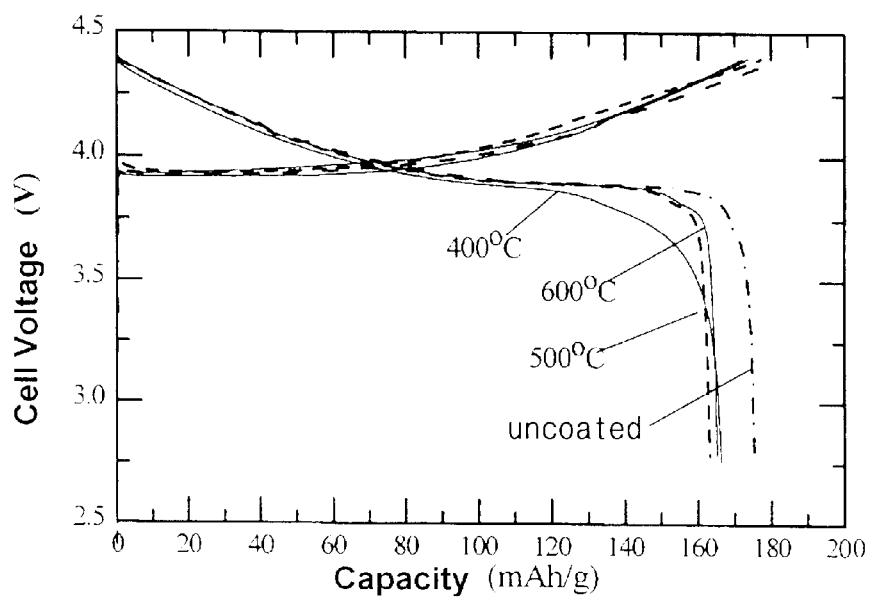
FIG. 5 is a graph illustrating initial charge and discharge capacities of a positive active material for a rechargeable lithium battery of the present invention prepared by varying the heat treatment temperature.
Figure 6:
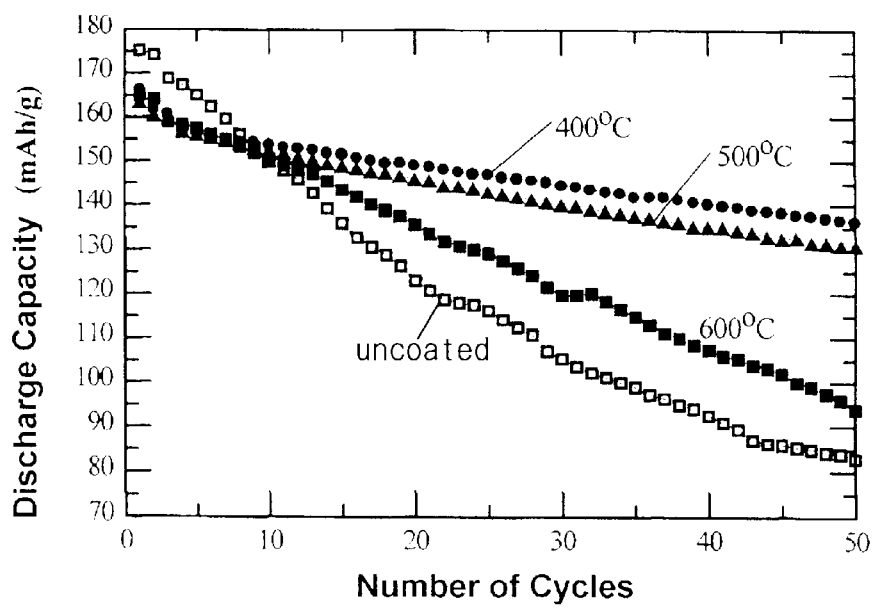
FIG. 6 is a graph illustrating life cycle characteristics of a positive active material for a rechargeable lithium battery of the present invention prepared by varying the heat treatment temperature.

Charge and discharge voltages curves and performance with continuous cycling of the positive electrodes containing the coated materials of Examples 2 and 3 (heat-treated at 400 and 500° C., respectively), Comparative Example 1 (heat-treated at 600° C.), and Comparative Example 2 (the uncoated $LiCoO_2$) are shown in FIGS. 5 and 6. The cycling test was carried out with charge and discharge voltage limits of 4.4V and 2.75V against a lithium metal counter electrode, respectively. Initial two cycles were carried out at 0.2C rate and subsequent 48 cycles at 0.5C rate for both charge and discharge. Although the coated materials of Examples 2 and 3 showed slightly lower initial capacity than the materials of Comparative Examples 1 and 2 as shown in FIG. 6, their performance with cycling is greatly improved. Even though the cycling performance data are not available presently, the cycling performance of the active material heat-treated at 150° C. (Example 1) was superior as well.

Figure 7:
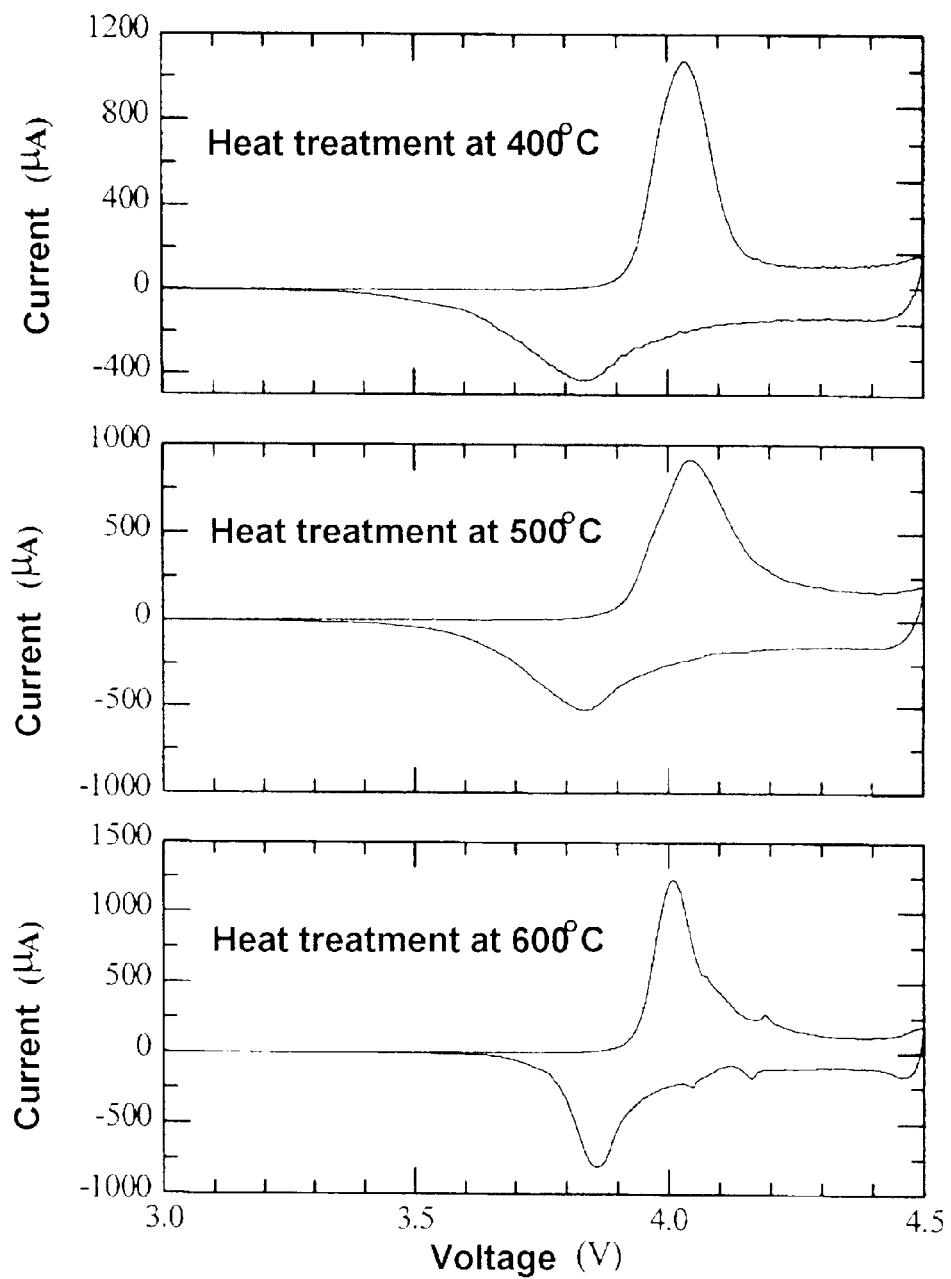
FIG. 7 is a graph illustrating currents and voltages of positive active materials for rechargeable lithium batteries of the present invention prepared by varying the heat treatment temperature.

Cyclic voltammogram results of the powders sintered at 400 (Example 2), 500 (Example 3) and 600° C. (Comparative Example 1) are shown in FIG. 7. The powder heat-treated at 400 and 500° C. did not show peaks representing typical monoclinic transition at around 4.15V. On the other hand, with the powder heat-treated at 600° C. as well as uncoated $LiCoO_2$ (not shown in FIG. 7), a monoclinic phase transition appears to occur. This observation might be due to the fact that the powders heat-treated at 400 and 500° C. have a higher concentration of Sn at the surface than powder heat-treated at 600° C. and uncoated $LiCoO_2$. The high concentration of Sn on the surface limits the formation of a monoclinic phase and improves cycle life characteristics.

For the positive active material for a rechargeable lithium battery of the present invention, specific capacity as well as the cycle life has been improved significantly through a surface coated material.

The present invention has been described in detail herein above. It should be understood that many variations and/or modifications of the basic inventive concepts taught herein which may appear to those skilled in the present art will still fall within the spirit and scope of the present invention, as defined in the appended claims.

What is claimed is:

1. A positive active material for a rechargeable lithium battery comprising:
   a metal selected from the group consisting of Al, Mg, Sn, Ca, Ti, Mn, and mixtures thereof and
   a core comprising $LiCoO_2$ and the metal, wherein the metal has a concentration gradient from a surface of the core to a center of the core, wherein the ratio of metal concentrations between the surface and the center of the core is 3 to 10:1.

2. The positive active material of claim 1 wherein the ratio of metal concentrations between the surface and the center of the core is 5 to 10:1.

3. A method of preparing a positive active material for a rechargeable lithium battery, the positive active material comprising a metal selected from a group consisting of Al, Mg, Sn, Ca, Ti, Mn and mixtures thereof, and a core comprising $LiCoO_2$ and the metal, the metal having a concentration gradient from a surface of the core to a center of the core, wherein the ratio of metal concentrations between the surface and the center of the core is 3 to 10:1, the method comprising:
   dissolving a metal compound in alcohol to prepare a metal compound solution in a sol state;
   coating $LiCoO_2$ with the metal compound solution in the sol state; and
   sintering the coated $LiCoO_2$ at 150 to 500° C.

4. The method of claim 3 wherein the metal is present in the metal compound solution coated on the $LiCoO_2$ in an amount ranging from 0.1 to 6 mol % based on the total amount of the metal and Co.

5. The method of the metal of claim 3 wherein the metal compound is a metal alkoxide including a metal selected from a group consisting of Al, Mg, Sn, Ca, Ti, Mn, and mixtures thereof.

* * * * *